United States Patent
Tseng et al.

(10) Patent No.: US 12,142,912 B2
(45) Date of Patent: Nov. 12, 2024

(54) MOTOR CONTROLLER AND MOTOR CONTROL METHOD FOR AN ELECTRONIC VEHICLE

(71) Applicant: INDUSTRIAL TECHNOLOGY RESEARCH INSTITUTE, Hsinchu (TW)

(72) Inventors: Nan-Hsiung Tseng, Hsinchu (TW); Bing-Ren Chen, New Taipei (TW); Shin-Hung Chang, Taoyuan (TW); Chin-Hone Lin, Puli Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 141 days.

(21) Appl. No.: 18/089,136

(22) Filed: Dec. 27, 2022

(65) Prior Publication Data

US 2024/0170954 A1 May 23, 2024

(30) Foreign Application Priority Data

Nov. 23, 2022  (TW) .................................. 111144820

(51) Int. Cl.
 *H02H 9/02* (2006.01)
 *B60L 7/10* (2006.01)
(52) U.S. Cl.
 CPC .................. *H02H 9/02* (2013.01); *B60L 7/10* (2013.01); *B60L 2240/421* (2013.01)
(58) Field of Classification Search
 CPC ........ B60L 2240/421; B60L 7/10; H02H 9/02
 See application file for complete search history.

(56) References Cited

U.S. PATENT DOCUMENTS

| | | | | |
|---|---|---|---|---|
| 4,950,913 A | * | 8/1990 | Kephart | ........... G01R 19/16542 |
| | | | | 327/392 |
| 6,781,350 B1 | * | 8/2004 | Iwatani | .................... H02J 7/243 |
| | | | | 322/17 |
| 9,041,327 B2 | | 5/2015 | Breitzmann et al. | |
| 9,889,741 B1 | * | 2/2018 | Tajima | .................. B60L 3/0046 |

(Continued)

FOREIGN PATENT DOCUMENTS

| | | |
|---|---|---|
| CN | 101791969 A | 8/2010 |
| CN | 103434415 A | 12/2013 |

(Continued)

OTHER PUBLICATIONS

Do et al., "Overvoltage Protection for Interior Permanent Magnet Synchronous Motor Testbench", 2018 25th International Workshop on Electric Drives: Optimization in Control of Electric Drives (IWED), Moscow, Russia. Jan. 31-Feb. 2, 2018, total 4 pages.

(Continued)

*Primary Examiner* — Thai T Dinh
(74) *Attorney, Agent, or Firm* — Birch, Stewart, Kolasch & Birch, LLP

(57) ABSTRACT

A motor control method for coupled an electronic vehicle is provided. The motor controller controls a motor and is powered by a battery. The motor control method includes: when a main relay of the motor controller suddenly breaks contact, in a first phase, feeding back a surge current into the battery to suppress the surge current by a diode and a first current limit resistor of a first protecting circuit of the motor controller; and, in a second phase, conducting a discharge switch of a second protecting circuit of the motor controller by a control unit of the motor controller, and releasing the surge current to a reference voltage range by the discharge switch and a second current limit resistor of the second protecting circuit.

9 Claims, 3 Drawing Sheets

(56) References Cited

U.S. PATENT DOCUMENTS

| | | | |
|---|---|---|---|
| 10,245,956 B2* | 4/2019 | Minesawa | B60L 3/04 |
| 11,296,495 B2 | 4/2022 | Lee et al. | |
| 2014/0118867 A1 | 5/2014 | Becerra et al. | |
| 2015/0115852 A1 | 4/2015 | Lee | |
| 2016/0355096 A1 | 12/2016 | Herke | |
| 2018/0361861 A1* | 12/2018 | Bando | G01R 31/392 |
| 2022/0052520 A1 | 2/2022 | Lee | |

FOREIGN PATENT DOCUMENTS

| | | | |
|---|---|---|---|
| CN | 203766542 U | 8/2014 | |
| CN | 106926741 A | 7/2017 | |
| CN | 104953898 B | 12/2017 | |
| CN | 206908278 U | 1/2018 | |
| CN | 107658954 A | 2/2018 | |
| JP | 6527561 B2 | 6/2019 | |
| TW | 201722021 A | 6/2017 | |
| TW | 202131591 A | 8/2021 | |
| TW | I764235 B | 5/2022 | |

OTHER PUBLICATIONS

Kapoor et al., "State of art of power electronics in circuit breaker technology", IEEE, 2012, pp. 615-622.

Park et al., "Overvoltage Suppressing Snubber Circuit for Solid State Circuit Breaker considering System Inductances", 10th International Conference on Power Electronics—ECCE Asia, May 27-30, 2019, BEXCO, Busan, Korea, total 6 pages.

Shen et al., "A Series-Type Hybrid Circuit Breaker Concept for Ultrafast DC Fault Protection", IEEE Transactions on Power Electronics, vol. 37, No. 6, Jun. 2022, pp. 6275-6279.

Shen et al., "Ultrafast Autonomous Solid State Circuit Breakers for Shipboard DC Power Distribution", IEEE, 2015, pp. 299-305.

Song et al., "Survey and Experimental Evaluation of Voltage Clamping Components for Solid State Circuit Breakers", 2021 IEEE Applied Power Electronics Conference and Exposition (APEC), pp. 401-406.

Taiwanese Office Action and Search Report for Taiwanese Application No. 111144820, dated Jun. 15, 2023.

* cited by examiner

MOTOR CONTROLLER AND MOTOR CONTROL METHOD FOR AN ELECTRONIC VEHICLE

This application claims the benefit of Taiwan application Serial No. 111144820, filed Nov. 23, 2022, the subject matter of which is incorporated herein by reference.

TECHNICAL FIELD

The disclosure relates in general to a motor controller and a motor control method for an electronic vehicle.

BACKGROUND

Due to the arising of environmental awareness, electronic vehicle has attracted people's increased attention. Given that the main relay of an electronic vehicle is in a normal state, when the electronic vehicle is cruising at a high speed, if the driver suddenly brakes, the motor back-electromotive force (back-EMF) energy may flow through an internal current path to charge a high-voltage battery. Such phenomenon is known as brake recharging.

However, when the main relay has already broken contact and become out of control or the driver has turned off the power of the electronic vehicle, the surge current caused by the back-EMF will damage the power element (such as a power switch) on the DC bus and other devices of the electronic vehicle.

Therefore, it has become a prominent task for the industries to provide a motor controller and a motor control method for an electronic vehicle capable of avoiding the surge current caused by the motor back-EMF energy of the electronic vehicle damaging power switch and other devices.

SUMMARY

According to one embodiment, provided is a motor controller for controlling a motor of an electronic vehicle, the motor controller being powered by a battery. The motor controller includes a power distribution unit and a control unit. The power distribution unit is coupled to the battery. The control unit is coupled to the power distribution unit and has a power hold function. The power distribution unit includes a main relay, a first protecting circuit and a second protecting circuit. A first terminal of the main relay is coupled to a positive electrode terminal of the battery; a second terminal of the main relay is coupled to a positive terminal of a direct-current (DC) bus. The first protecting circuit coupled in parallel with the main relay, the first protecting circuit is coupled to the battery, the first protecting circuit comprises a diode and a first current limit resistor, wherein, the diode is connected in series with the first current limit resistor. The second protecting circuit comprises a discharge switch and a second current limit resistor, wherein the discharge switch is coupled in series with the second current limit resistor, the second protecting circuit is coupled in parallel between the positive terminal of the DC bus and a negative terminal of the DC bus and is interposed between the second terminal of the main relay and the positive terminal of the DC bus. When the main relay suddenly breaks contact, in a first phase, the diode and the first current limit resistor of the first protecting circuit feed back a surge current into the battery to suppress the surge current; and in a second phase, the control unit conducts the discharge switch, and the discharge switch and the second current limit resistor of the second protecting circuit release the surge current to a reference voltage range.

According to another embodiment, provided is motor control method for a motor controller of an electronic vehicle, the motor controller controlling a motor and the motor controller powered by a battery, wherein the motor control method is stored or installed in a control unit of the motor, and wherein the motor control method is read or activated by the control unit to perform the following steps: when a main relay of the motor controller suddenly breaks contact, in a first phase, feeding back a surge current into the battery to suppress the surge current by a diode and a first current limit resistor of a first protecting circuit of the motor controller; and, in a second phase, conducting a discharge switch of a second protecting circuit of the motor controller by a control unit of the motor controller, and releasing the surge current to a reference voltage range by the discharge switch and a second current limit resistor of the second protecting circuit.

The above and other aspects of the invention will become better understood with regard to the following detailed description of the preferred but non-limiting embodiment(s). The following description is made with reference to the accompanying drawings.

Figure 1:
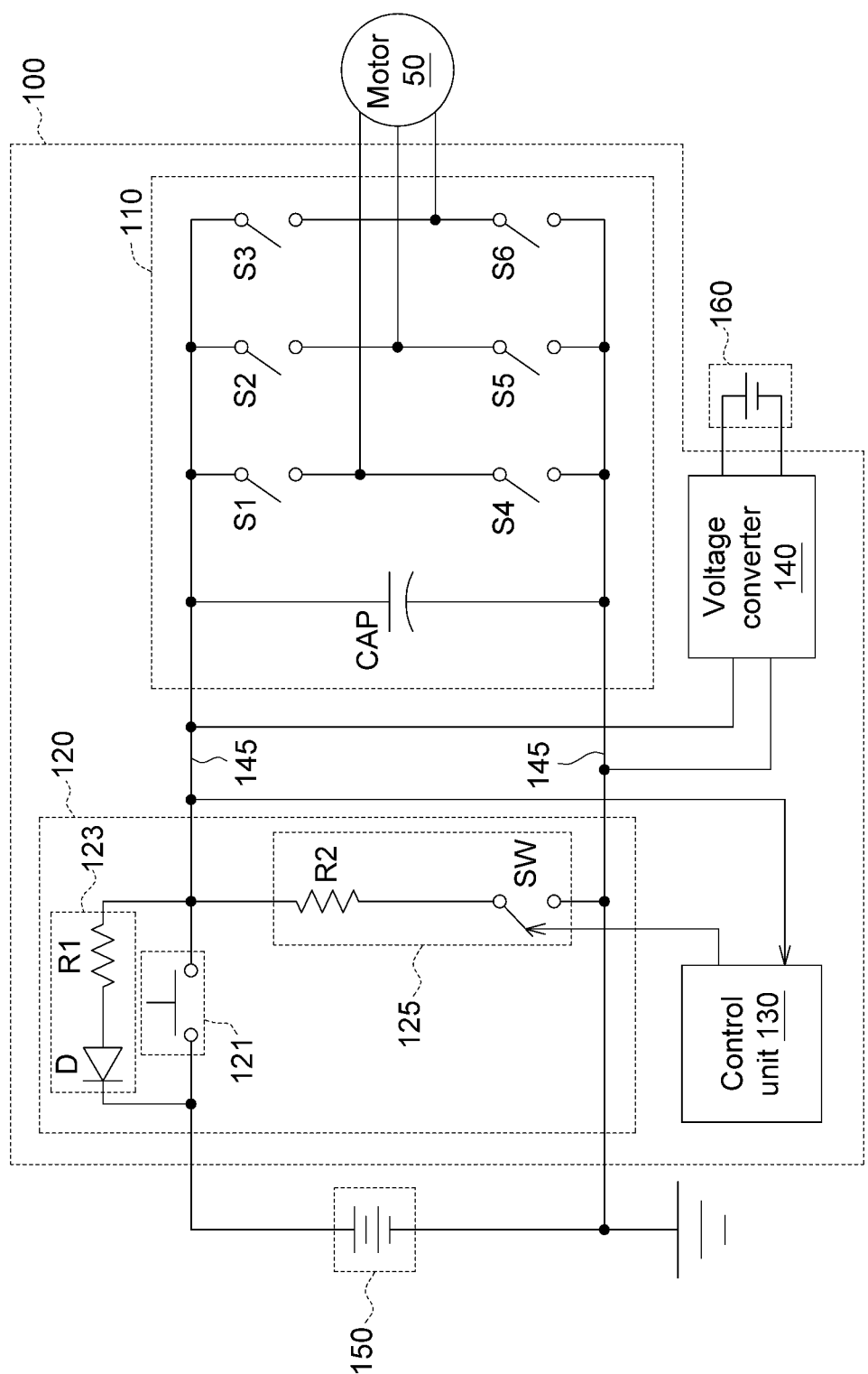
FIG. 1 is a circuit diagram of a motor controller for an electronic vehicle according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical terms are used in the specification with reference to the prior art used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

Figure 2:
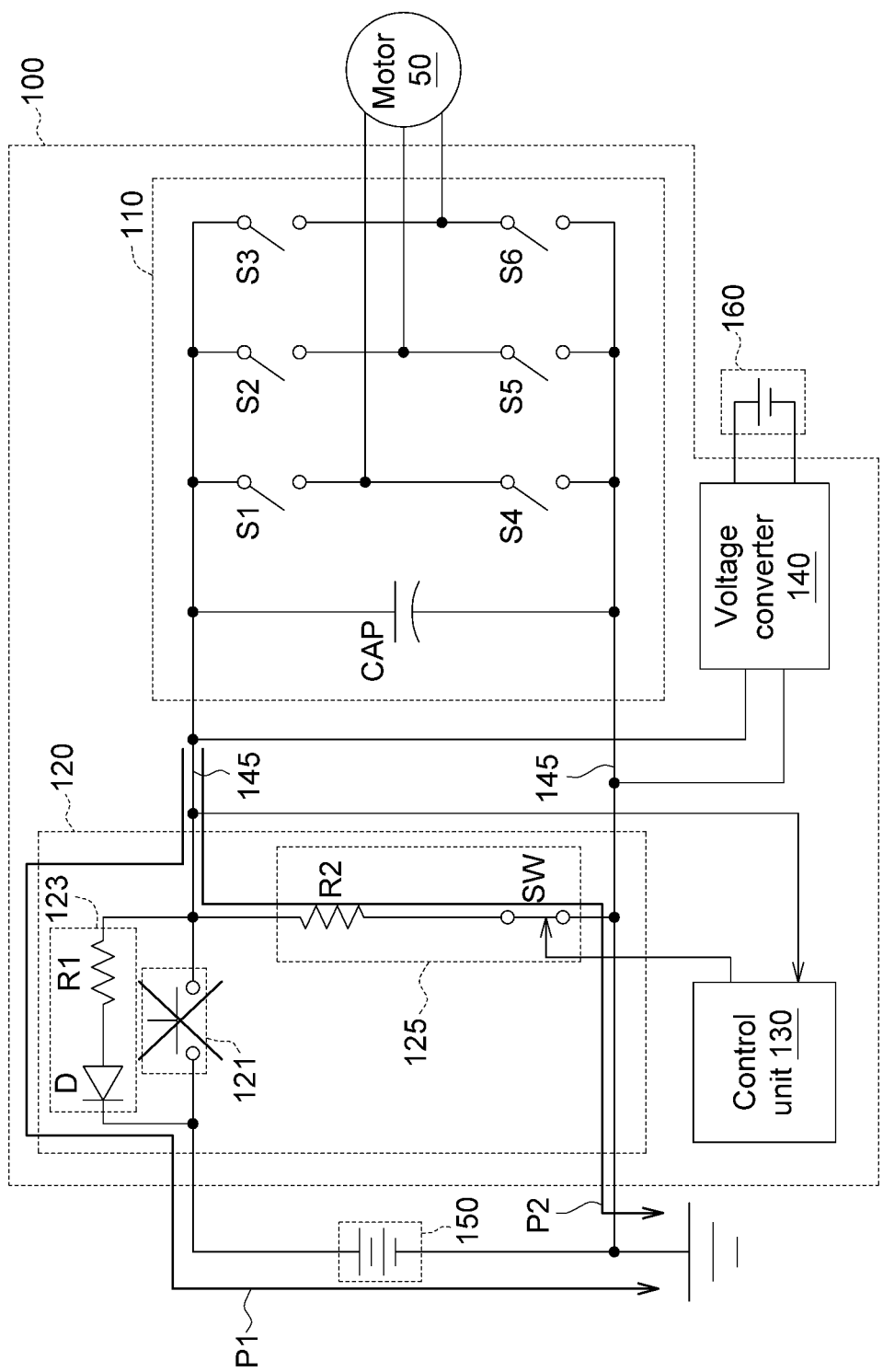
FIG. 2 is an operation diagram of a motor controller for an electronic vehicle according to an embodiment of the present disclosure.

FIG. 1 is a circuit diagram of a motor controller for an electronic vehicle according to an embodiment of the present disclosure. FIG. 2 is an operation diagram of a motor controller for an electronic vehicle according to an embodiment of the present disclosure. As indicated in FIG. 1, the motor controller for an electronic vehicle 100 according to an embodiment of the present disclosure includes a power stage 110, a power distribution unit (PDU) 120, a control unit 130 and a voltage converter 140. The motor controller 100 is configured to control a motor 50. The motor controller 100 is coupled to and powered by a first battery 150 and a second battery 160.

The power stage 110 is coupled to the motor 50 and provides power to the motor 50. In an embodiment of the present disclosure, the power stage 110 is realized by a three-phase six-arm power stage but is not limited thereto. The power stage 110 includes switches S1~S6 and a capacitor CAP. The switches S1 and S4 are connected in series between the positive terminal and the negative terminal of the DC bus 145. The switches S2 and S5 are connected in series between the positive terminal and the negative terminal of the DC bus 145. The switches S3 and S6 are connected in with between the positive terminal and the negative terminal of the DC bus 145. The switches S1~S6 are controlled by the control unit 130. The capacitor CAP crosses between the positive terminal and the negative terminal of the DC bus 145.

The power distribution unit 120 includes a main relay 121, a first protecting circuit 123 and a second protecting circuit 125.

A first terminal (negative terminal) of the main relay 121 is coupled to a positive electrode terminal of the first battery 150; a second terminal (positive terminal) of the main relay 121 is coupled to the positive terminal of the DC bus 145.

The first protecting circuit 123 is connected in parallel with the main relay 121. The first protecting circuit 123 includes a flywheel diode D and a first current limit resistor R1, wherein, the flywheel diode D is connected in series with the first current limit resistor R1. The first protecting circuit 123 is configured to suppress the surge current to avoid the surge current damaging other elements. The first protecting circuit 123 can feed back the surge current into the first battery 150 to suppress the surge current.

The second protecting circuit 125 includes a discharge switch SW and a second current limit resistor R2, wherein the discharge switch SW is connected in series with the second current limit resistor R2. The second protecting circuit 125 is connected in parallel between the positive terminal and the negative terminal of the DC bus 145 and is interposed between the positive terminal of the main relay and the positive terminal of the DC bus 145. The second protecting circuit 125 can quickly suppress the surge current and release the surge voltage to a low-voltage range.

In an embodiment of the present disclosure, when the main relay 121 suddenly breaks contact, in a first phase, the flywheel diode D and the first current limit resistor R1 of the first protecting circuit 123 feed back the surge current into the first battery 150 to suppress the surge current and achieve an immediate current suppression. In the first phase, the surge current path is the current path P1 of FIG. 2. Then, in a second phase, the discharge switch SW and the second current limit resistor R2 of the second protecting circuit 125 release the surge current to a ground terminal, so that the surge current is quickly release to an allowable low-voltage range. In the second phase, the surge current path is the current path P2 of FIG. 2.

The control unit 130 is coupled to the power stage 110 and the power distribution unit 120, and has a power hold function. That is, when the power of the electronic vehicle is suddenly cut off, the power of the control unit 130 will not be immediately cut off. The control unit 130 still can temporarily hold the power to perform control operations.

In an embodiment of the present disclosure, the control unit 130 is realized by a vehicle control unit (VCU) but is not limited thereto. The control unit 130 includes an electronic control unit (not illustrated) and a control circuit (not illustrated), wherein the electronic control unit can receive an electronic vehicle status information. The electronic vehicle status information contains but is not limited to a motor speed, a voltage value of the main relay, and a voltage value of the DC bus. The electronic control unit can control a discharge switch SW to be turned on/off. The control unit 130 can be implemented by hardware, software or firmware without breaching the spirit of the present disclosure.

The voltage converter 140, coupled to the second battery 160, is configured to convert a battery voltage of the second battery 160 and provide the converted battery voltage to the DC bus 145. In an embodiment of the present disclosure, the voltage converter 140 can be realized by a DC/DC voltage converter but is not limited thereto.

The first battery 150 can be realized by a high-voltage battery but is not limited thereto. The first battery 150 is coupled to the main relay 121.

The second battery 160 can be realized by a 12V battery but is not limited thereto. The second battery 160 is coupled to the voltage converter 140.

The motor control method for an electronic vehicle according to an embodiment of the present disclosure, also referred as motor back-EMF energy recycling control method, is configured to control the motor controller 100. The motor control method for an electronic vehicle can be stored or installed in the control unit 130 in the form of software, firmware or circuit and can be read or activated by the control unit 130 to perform the following steps: (1) determining whether the back-EMF has met the activation condition of the surge current by the control unit 130 according to the motor speed and a voltage value of the DC bus 145; (2) if the main relay 121 is turned on and the back-EMF has met the activation condition of the surge current, conducting the discharge switch SW by the control unit 130 to suppress the current.

Figure 3:
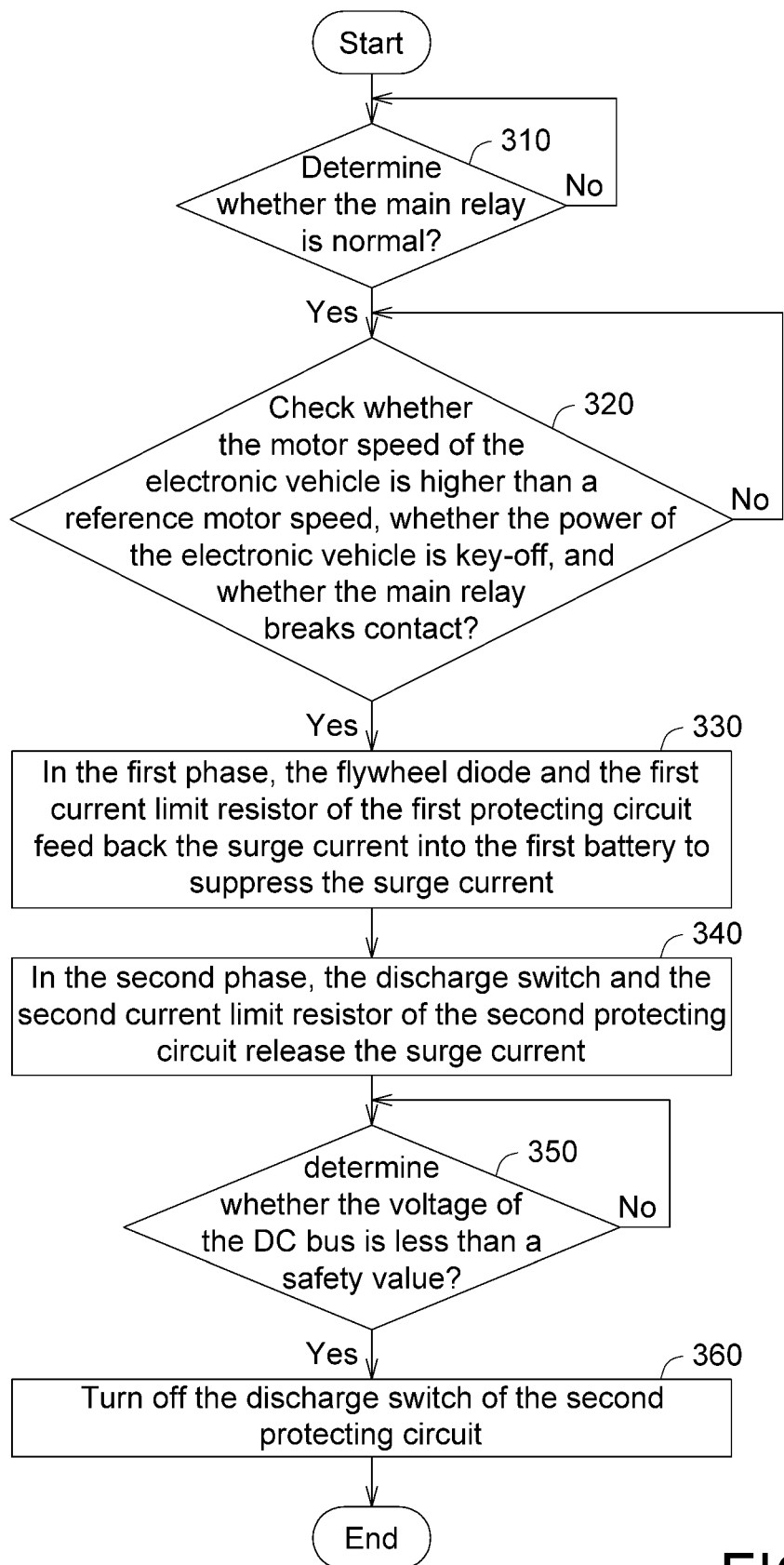
FIG. 3 is a flowchart of a motor control method for an electronic vehicle according to an embodiment of the present disclosure.

FIG. 3 is a flowchart of a motor control method for an electronic vehicle according to an embodiment of the present disclosure. In step 310, whether the main relay 121 is normal is checked by the control unit 130. When the main relay 121 is normal, the method proceeds to step 320. When the main relay 121 is abnormal, the method repeats step 310.

In step 320, whether the motor speed of the electronic vehicle is higher than a reference motor speed (such as but not limited to 5000 rpm), whether the power of the electronic vehicle is key-off and whether the main relay 121 breaks contact are checked by the control unit 130. When all of the three checks in step 320 are affirmative, the method proceeds to step 330. When at least one of the three checks in step 320 is negative, the method repeats step 320.

In step 330, in a first phase, the surge current is suppressed (the surge current is fed back into a first battery 150) by the flywheel diode D and the first current limit resistor R1 of the first protecting circuit 123 to achieve immediate current suppression.

In step 340, the discharge switch SW of the second protecting circuit 125 is conducted by the control unit 130. That is, in step 340, in a second phase, the surge current is released to a ground terminal by the discharge switch SW and the second current limit resistor R2 of the second protecting circuit 125, so that the surge current can be quickly released to an allowable low-voltage range.

In step 350, whether the voltage of the DC bus is less than a safety value (such as but not limited to 80V+10%) is determined by the control unit 130.

When the determination in step 350 is affirmative, the method proceeds to step 360. When the determination in step 350, the method repeats step 350.

In step 360, the discharge switch SW of the second protecting circuit 125 is turned off by the control unit 130.

According to the above embodiments of the present disclosure, protection is implemented in the light of the entire system of the vehicle, through the use of two protecting circuits (123 and 125), the back-EMF energy can be fed back into the high-voltage battery 150 and the surge current can be suppressed. In the first phase when the main relay 121 suddenly breaks contact, the flywheel diode D and the first current limit resistor R1 of the first protecting circuit 123 suppress the surge current to achieve immediate current suppression. Next, in a second phase, the discharge switch SW and the second current limit resistor R2 of the second protecting circuit 125 quickly release the surge current to an allowable low-voltage range (including but not limited to 80V+10%).

The experimental simulation shows that in the prior art, when a surge current occurs and the main relay breaks contact, the voltage of the DC bus may reach 120V, and it takes the system a long time to get rid of the surge current. Conversely, in an embodiment of the present disclosure, when a surge current occurs, regardless of whether the main relay breaks contact or not, the voltage of the DC bus is limited to be around 82V, so that the surge current can be fed back into a high-voltage battery. Therefore, in the embodiment of the present disclosure, not only can the surge voltage be suppressed, but also the energy can be effectively fed back to a high-voltage battery to achieve a high reuse rate of energy.

According to the embodiments of the present disclosure, protection is implemented in the light of the entire system of the vehicle. Through the use of two protecting circuits in cooperation with a control technology, the back-EMF energy can be recycled to a high-voltage battery (150) and the surge current can be suppressed, hence avoiding the surge current caused by the back-EMF damaging power switch and other controllers.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A motor controller for controlling a motor of an electronic vehicle, the motor controller being powered by a battery, the motor controller comprising:
    a power distribution unit coupled to the battery; and
    a control unit coupled to the power distribution unit, wherein the control unit has a power hold function, wherein,
    the power distribution unit comprises a main relay, a first protecting circuit and a second protecting circuit;
    a first terminal of the main relay is coupled to a positive electrode terminal of the battery; a second terminal of the main relay is coupled to a positive terminal of a direct-current (DC) bus;
    the first protecting circuit coupled in parallel with the main relay, the first protecting circuit is coupled to the battery, the first protecting circuit comprises a diode and a first current limit resistor, wherein, the diode is connected in series with the first current limit resistor;
    the second protecting circuit comprises a discharge switch and a second current limit resistor, wherein the discharge switch is coupled in series with the second current limit resistor, the second protecting circuit is coupled in parallel between the positive terminal of the DC bus and a negative terminal of the DC bus and is interposed between the second terminal of the main relay and the positive terminal of the DC bus; and
    when the main relay suddenly breaks contact, in a first phase, the diode and the first current limit resistor of the first protecting circuit feed back a surge current into the battery to suppress the surge current; and in a second phase, the control unit conducts the discharge switch, and the discharge switch and the second current limit resistor of the second protecting circuit release the surge current to a reference voltage range.

2. The motor controller according to claim 1, wherein, the control unit receives an electronic vehicle status information including a motor speed, a voltage value of the main relay and a voltage value of the DC bus.

3. The motor controller according to claim 1, wherein,
    the control unit determines whether a back-EMF has met an activation condition of the surge current according to a motor speed and a voltage value of the DC bus; and
    when the main relay is turned on and the back-EMF has met the activation condition of the surge current, the control unit conducts the discharge switch.

4. The motor controller according to claim 1, wherein,
    when the control unit determines that the main relay is normal, the control unit further checks whether a motor speed of the electronic vehicle is higher than a reference motor speed, whether a power of the electronic vehicle is key-off, and whether the main relay breaks contact;
    when the motor speed of the electronic vehicle is higher than the reference motor speed, the power of the electronic vehicle is key-off, and the main relay breaks contact, in the first phase, the diode and the first current limit resistor of the first protecting circuit suppress the surge current and feed back the suppressed surge current into the battery;
    in the second phase, the control unit conducts the discharge switch, so that the discharge switch and the second current limit resistor of the second protecting circuit release the surge current;
    the control unit determines whether a DC bus voltage is less than a safety value; and
    when the control unit determines that the DC bus voltage is less than the safety value, the control unit turns off the discharge switch of the second protecting circuit.

5. A motor control method for a motor controller of an electronic vehicle, the motor controller controlling a motor and the motor controller powered by a battery, wherein the motor control method is stored or installed in a control unit of the motor, wherein the motor control method is read or activated by the control unit to perform the following steps:
    when a main relay of the motor controller suddenly breaks contact, in a first phase, feeding back a surge current into the battery to suppress the surge current by a diode and a first current limit resistor of a first protecting circuit of the motor controller; and
    in a second phase, conducting a discharge switch of a second protecting circuit of the motor controller by the control unit of the motor controller, and releasing the surge current to a reference voltage range by the discharge switch and a second current limit resistor of the second protecting circuit.

6. The motor control method according to claim 5, wherein,
    the control unit has a power hold function;

a first terminal of the main relay is coupled to a positive electrode terminal of the battery; a second terminal of the main relay is coupled to a positive terminal of a DC bus;

the first protecting circuit is coupled in parallel with the main relay and coupled to the battery, wherein the diode is connected in series with the first current limit resistor; and the discharge switch is coupled in series with the second current limit resistor; the second protecting circuit is coupled in parallel between the positive terminal of the DC bus and a negative terminal of the DC bus and is interposed between the second terminal of the main relay and the positive terminal of the DC bus.

7. The motor control method according to claim 5, wherein, the control unit receives an electronic vehicle status information including a motor speed, a voltage value of the main relay and a voltage value of the DC bus.

8. The motor control method according to claim 5, wherein, the control unit determines whether a back-EMF has met an activation condition of the surge current according to a motor speed and a voltage value of the DC bus; and when the main relay is turned on and the back-EMF has met the activation condition of the surge current, the control unit conducts the discharge switch.

9. The motor control method according to claim 5, wherein, when the control unit determines that the main relay is normal, the control unit further checks whether a motor speed of the electronic vehicle is higher than a reference motor speed, whether a power of the electronic vehicle is key-off, and whether the main relay breaks contact;

when the motor speed of the electronic vehicle is higher than the reference motor speed, the power of the electronic vehicle is key-off and the main relay breaks contact, in the first phase, the diode and the first current limit resistor of the first protecting circuit suppress the surge current and feed back the suppressed surge current into the battery;

in the second phase, the control unit conducts the discharge switch, so that the discharge switch and the second current limit resistor of the second protecting circuit release the surge current;

the control unit determines whether a DC bus voltage is less than a safety value; and when the control unit determines that the DC bus voltage is less than the safety value, the control unit turns off the discharge switch of the second protecting circuit.

\* \* \* \* \*